United States Patent [19]

Froberg

[11] 4,325,724

[45] Apr. 20, 1982

[54] METHOD FOR MAKING GLASS

[75] Inventor: Magnus L. Froberg, Granville, Ohio

[73] Assignee: Owens-Corning Fiberglas Corporation, Toledo, Ohio

[21] Appl. No.: 841,860

[22] Filed: Oct. 6, 1977

Related U.S. Application Data

[63] Continuation of Ser. No. 680,841, May 5, 1976, abandoned, which is a continuation-in-part of Ser. No. 624,616, Oct. 23, 1975, abandoned, which is a continuation-in-part of Ser. No. 526,876, Nov. 25, 1974, abandoned.

[51] Int. Cl.³ .............................................. C03B 5/16
[52] U.S. Cl. ...................................... 65/121; 65/135; 65/178; 501/35
[58] Field of Search ................. 65/134, 135, 136, 121, 65/178, 179, 180; 106/52, DIG. 8

[56] References Cited

U.S. PATENT DOCUMENTS

| | | |
|---|---|---|
| 805,139 | 11/1905 | Hitchcock . |
| 2,294,373 | 9/1942 | Batchell . |
| 2,311,870 | 2/1943 | Richardson et al. ...................... 65/5 |
| 2,934,444 | 4/1960 | Smith . |
| 2,955,948 | 10/1960 | Silverman . |
| 3,024,121 | 3/1962 | Hagedorn . |
| 3,343,935 | 9/1967 | Keefer et al. . |
| 3,350,213 | 10/1967 | Peyches . |
| 3,445,255 | 5/1969 | Monks, Jr. . |
| 3,466,160 | 9/1969 | Keefer .................................. 65/157 |
| 3,481,750 | 12/1969 | Swain . |
| 3,482,955 | 12/1969 | Monks .................................. 65/134 |
| 3,628,932 | 12/1971 | Inoue .................................... 65/134 |
| 3,810,745 | 5/1974 | Hagedorn et al. .................... 65/134 |

FOREIGN PATENT DOCUMENTS 711702 9/1941 Fed. Rep. of Germany .
2000127 8/1969 France .

OTHER PUBLICATIONS

"The Unconventional Glass Melt," G. Steinke Glas--Email-Keramo-Tech., 1974, 25(5) 115–118.

Primary Examiner—Arthur D. Kellogg
Attorney, Agent, or Firm—Ronald C. Hudgens; Robert F. Rywalski; Charles F. Schroeder

[57] ABSTRACT

An improved method of preparing a molten glass composition is presented. The constituents of the molten glass composition are classified into two or more melting groups according to mutual melting properties or characteristics such as volatility, corrosiveness or fusion point. Of the constituent groups one is selected and prepared as a molten base glass composition into which the remaining groups are sequentially introduced and homogenized into the base glass forming a molten glass composition of desired forming characteristics.

7 Claims, 11 Drawing Figures

METHOD FOR MAKING GLASS

RELATED APPLICATIONS

The application is a continuation, of application Ser. No. 680,841, filed May 5, 1976, which is a continuation-in-part of my co-pending application Ser. No. 624,616, filed Oct. 23, 1975, which is a continuation-in-part of my co-pending application Ser. No. 526,876, filed Nov. 25, 1974 all now abandoned.

BACKGROUND OF THE INVENTION

The present invention relates to an improved method for preparing molten glass compositions. Heretofore, molten glass compositions have been prepared by charging a formulation of batch ingredients, containing all constituents desired in the glass composition, into a melter or furnace wherein heat is applied in sufficient quantity to cause the batch ingredients to fuse and react with each other forming a mass of molten constituents. The resulting molten mass is generally homogenized or refined within the melting apparatus forming a molten glass composition from which glass products are produced.

In the mass production of glass products, preparation of molten glass is preferably a continuous process wherein the melting unit contains a reservoir of molten constituents into which the batch formulation is charged at a rate responsive to the molten glass withdrawal or pull rate. During the time the molten constituents reside within the melter they further react with one another forming a homogenized molten glass of the desired composition. A typical constituent residence time for a melter producing 150 tons of molten glass per day is approximately 24 to 48 hours or greater. The temperature of the molten constituents residing in the melter must be maintained at a sufficient level to react the incoming batch ingredients. Hence, a portion of the molten constituents which volatilize at temperatures below the established melter operating temperature are lost as flue gas. Therefore, to obtain a given molten glass composition, suitable for forming, the batch formulation must compensate for the proportion of constituents lost by volatilization during melter residence.

The prior glass melting methods restrict glass compositions to compositions containing only those constituents which can survive the environment of the glass melting apparatus. By currently known methods of preparing molten glass, having particular properties or forming characteristics, it is necessary to introduce into the melting furnace all of the constituents that must be present in the final molten glass composition to produce those properties or characteristics. Many times the presence of those constituents in the melter is undesirable because of their volatility, corrosiveness, or environmental affects. The consequence, recognized for years is that the compositions of some glasses are impractical to produce commercially because of the volatility, corrosiveness or environmental affect of their constituents.

Certain hostile glasses, however, have desirable properties and are commercially produced under such adverse conditions as to add significantly to their cost. For example, borosilicate glass compositions generally contain volatile constituents such as boric oxide ($B_2O_3$), fluorine ($F_2$), and sodium borate $Na_2O \cdot XB_2O_3$. These constituents not only volatilize at melter operating temperatures but also shorten melter life by their chemical attack upon refractory materials.

SUMMARY OF THE INVENTION

The present invention relates to an improved method for preparing molten glass compositions suitable for subsequent forming into useful glass products. By my method of making glass the constituents of the desired molten glass composition are selectively classified into two or more melting groups. The melting groups are separately prepared, preferably as molten masses. One group, generally the one of greatest mass, is chosen as a base or host glass into which the other groups may be sequentially mixed and homogenized to form the desired molten glass composition.

The classification criteria for example by which the melting groups are formulated may be based upon fusion temperature of the constituents, or any other mutual processing characteristic such as corrosiveness, softening point, volatility etc. The classification criteria of one group need not necessarily exclude constituents of other groups. For example, if the constituents are classified according to fusion temperature, the temperature range of one constituent group may overlap the temperature range of other constituent groups. Thus, two or more constituent groups may contain a common constituent. It may also be found desirable in formulating a particular melting group to include a constituent, otherwise excluded by the group classification criteria to assist melting of that group or in some other way alter its properties to obtain the most desirable processing characteristics for that melting group.

Applying the principles of my invention to the preparation of a molten fiberizable glass composition comprising silicon oxide ($SiO_2$), aluminum oxide ($Al_2O_3$), calcium oxide ($CaO$), boric oxide ($B_2O_3$), fluorine ($F_2$), and sodium oxide ($Na_2O$), two melting groups may be identified. The highly volatile constituents, $B_2O_3$, $F_2$ and $Na_2O \cdot XB_2O_3$ are preferably grouped together as a volatile oxide group. The remaining constituents $SiO_2$, $Al_2O_3$, $Na_2O$ and $CaO$ may be grouped together as a relatively non-volatile group. The non-volatile group is recognized as soda lime glass, a composition relatively common to the glass industry and may be prepared as a molten base glass in a high production glass melting furnace of the continuous type common to the glass making industry. To this relatively non-volatile molten base glass composition the volatile constituent group may be added either as a molten composition or as a batch formulation. The volatile constituent group may be introduced into the molten base composition at any convenient location downstream of the non-volatile constituent group's melting area. Preferably the volatile constituent group is introduced to the molten base glass immediately downstream of the base glass melter's exit throat thereby taking advantage of the base glass' exit temperature and residual heat. However, the volatile constituent group might be introduced directly into the base glass melter's throat area or any other favorable or otherwise advantageous location between the base glass melting area and the glass forming position.

The base composition will generally be identified as that melting group representing the larger volumetric portion of the total composition. Thus, for most known commercial glasses the ratio of base to additive will lie within the range of 1:1 to 20:1.

By my multi-step method of making glass a freedom of melter design can be realized heretofore unknown in the industry. Melter design and operation need no longer be dictated by the molten glass composition produced therefrom. Hostile glass compositions may be formulated into two or more melting groups such that the more troublesome constituents such as the highly volatile, may be removed from the composition and prepared separate and apart from the less troublesome constituents. Generally speaking the volatile constituents of most concern in present day glass making operations are, boric oxide ($B_2O_3$), sodium borates ($Na_2O \cdot xB_2O_3$) resulting from the presence of $Na_2O$ and $B_2O_3$, fluorine ($F_2$), and lead oxide (PbO). These constituents generally represent a minor portion of the total glass composition and have relatively low fusion temperatures. Therefore, they may be melted in a specially designed melter smaller in size than the base glass melter and operated at a lower temperature. Thus, less volatilization loss will occur and since the volatile melter is small compared to commercial tank melters, pollution prevention problems are significantly reduced.

Most volatiles in glass compositions are also solvents of known refractory materials. Therefore, any amount of volatile reduction in the glass melter may be expected to extend melter life. In commercially melting of borosilicate glasses those having at least 3% $B_2O_3$, I have found that melter life may be extended approximately 100% by a 50% reduction of $B_2O_3$ in the melter.

According to the concepts of the present invention a desired composition of glass can be made by separating the high temperature and the low temperature constituents of the composition into at least two portions and separately processing each, the high temperature constituents being processed to a molten condition. With the high temperature material in a molten state the low temperature materials can be combined directly therewith whereupon the two are quickly if not immediately subjected to a vigorous working or intermixing of incremental segments by application of external forces to a degree such that the combination is in effect homogenized. Before appreciable effluence of the low temperature constituents can occur if the high temperature homogenized combination is not then to be used directly, it is preferably lowered in temperature closer to its new softening temperature to reduce tendencies for the volatile ingredients to evolve as effluents.

Another feature of the invention is that the high temperture portion of the composition in the absence of the constituents of the low temperature portion can be efficiently preheated in a batch state to a much higher temperature prior to initiation of conversion to a molten mass than when the two portions are in combination in a common batch as in conventional glass producing process.

Energy consumption, effluent evolution and the size of the melter can all be reduced according to the concepts of the present invention. In addition, the life of the refractory for containing the major portion of the molten material can be increased considerably. Still further, since the residence time of the low temperature materials in high temperature zones is greatly reduced, consumption of the low temperature materials required to produce a composition is much less than experienced in producing glass by conventional melting techniques. Such low temperature materials include fluxes required to lower the melting temperature and additives for improving the durability of the final glass. These constituents are usually considerably more expensive then the base silica material of the composition. Accordingly to produce a glass of the desired composition, the cost of raw input material can also be reduced considerably.

A feature of the present invention relates to an improved method for producing molten glass and products therefore, particularly although not necessarily glass fibers, and more particularly a method for eliminating, controlling, or simplifying the control of effluent to the atmosphere from the volatile bearing constituents in the batch formulation, consisting of at least 3% boric oxide bearing constituents with or without fluorine bearing constituents. For example, glass compositions suitable for glass fiber manufacture for the production of glass wool, or plastics reinforcements or other end products are generally borosilicate glasses and their compositions contain volatile constituents in quantities sufficient to affect their forming characteristics, such as boron oxide ($B_2O_3$), fluorine ($F_2$), and/or sodium borate ($Na_2OxB_2O_3$). These constituents not only volatilze at melter operating temperatures, but also their presence in the melt shorten melter life by corrosive or chemical attack upon refractory materials.

When removing the volatile constituents from borosilicate glasses and particularly glasses used for the production of glass fibers it has been discovered that the remaining glass forming constituents can be practically melted in a conventional type furnace, either in that the remaining constituents form what may be regarded as a eutectic; that is, among the lowest liquidus melting temperature compositions, or at least the remaining constituents are sufficiently capable of being melted in a conventional furnace; but in either case, the forming characteristics of the remaining constituents when in the molten state are incapable of effective manipulation and forming into the desired end product, principally because viscosity and/or liquidus temperatures are excessive and unsuitable for forming in a practicable way. In accordance with the present invention, the volatilizable constituents are separately melted and then added to the molten mass of the remaining constituents, the intimately mixed, preferably by stirring mechanically, to homogenize and provide the proper forming characteristics, and thereafter formed into end products.

It is known in the industry that the efficiency of the glass making process may be improved by pre-heating of the formulated batch prior to charging it to the melter. However, the efficiency gain is recognized as being limited by the particular batch formulation sintering temperature. By application of my multi-step glass making technique the sintering temperature of the base glass batch formulation, which represents the greater bulk of the total, may be significantly raised by selectively eliminating the relatively low sintering ingredients such as soda ash. The lower sintering ingredients may be separately processed as a group, with or without pre-heating, in a manner most efficient for the particular ingredients therein. Thus, for a given desired glass composition a melting process and apparatus may be engineered to achieve the greatest thermal efficiency.

Thus, by my multi-step method of glass making it is no longer necessary to melt all of the desired glass composition's constituents in a common glass melter as one all inclusive batch formulation. For a given desired glass composition a melting process and apparatus may now be engineered to achieve the most optimum process in view of environmental affects, energy expenditure, melter life or a combination thereof depending upon the goal to be achieved.

DETAILED DESCRIPTION OF THE INVENTION

Figure 1:
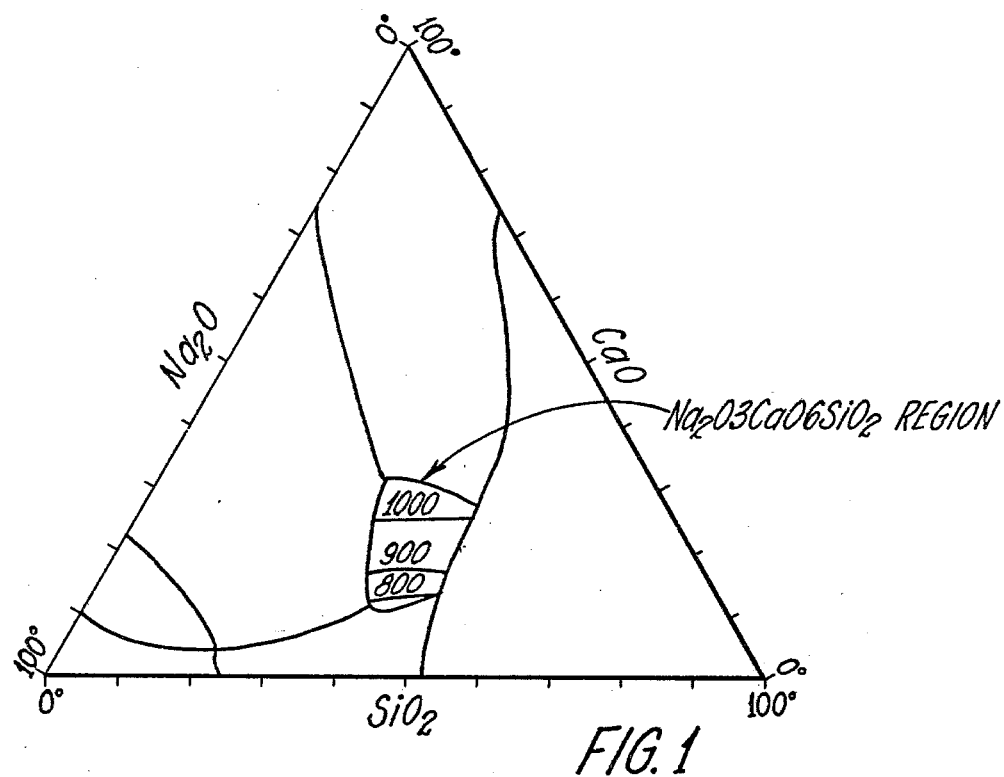
FIG. 1 presents a phase diagram for the $SiO_2$—$Na_2O$—$CaO$ system showing isotherms for the $Na_2O3CaO6SiO_2$ region.

My invention is particularly useful for preparing borosilicate glasses as commonly used to manufacture glass fibers. However, as will be disclosed below, it offers advantages to all areas of the glass making industry. Although the following discussion will be especially directed toward the glass fiber industry it is to be understood that the broad principles of the invention may be practiced by other glass melting operations.

According to "The Handbook Of Glass Manufacture," 1974 edition by Dr. Fay V. Tooley, a glass composition may contain most any of the periodic table elements. However, few glass compositions are without substantial quantities of silicon, boron, or phosphorus. Most often these elements exist in oxide form. The glass making industry refers to these and other glass forming oxides as "glass formers" and those oxides which have little glass forming characteristics as "modifiers" with a group therebetween identified as "intermediates." Dr. Tooley, at page 3 of the above cited work, provides the following classification of glass formers, intermediates and modifiers:

TABLE I

| Glass Formers | Intermediates | Modifiers |
|---|---|---|
| $B_2O_3$ | $Al_2O_3$ | MgO |
| $SiO_2$ | $Sb_2O_3$ | $Li_2O$ |
| $CeO_2$ | $ZrO_2$ | BaO |
| $P_2O_5$ | $TiO_2$ | CaO |
| $V_2O_5$ | PbO | SrO |
| $As_2O_3$ | BeO | $Na_2O$ |
|  | ZnO | $K_2O$ |

The glass making potential of the above table of oxides decreases as you progress from top to bottom of each column moving left to right. Thus, $B_2O_3$ exhibits the greatest glass forming characteristic and $K_2O$ the least. No sharp line of distinction exists between $As_2O_3$ and $Al_2O_3$ nor between ZnO and MgO.

Dr. Tooley, at page 5 of the above cited work, lists the approximate commercial glass compositions presented in Table II. It is noted from Table II that the Borosilicate and Lead glass compositions contain two very good formers, $B_2O_3$ and $SiO_2$ along with $Al_2O_3$ which although classified as an intermediate in Table I may act as a former. Thus, these glasses are especially good candidates for producing by my method of glass making. Each of these glasses may be formulated into two separate glass compositions or melting groups. For example, one formulation may use $SiO_2$ as its glass former and the other $B_2O_3$. Another possibility may be to take advantage of the glass forming characteristics of intermediate $Al_2O_3$ and formulate three separate glass compositions, the third having $Al_2O_3$ as its forming oxide. Each of these melting groups may in turn be formulated to obtain certain processing advantages depending upon the particular constraints confronting the glass maker.

TABLE II

| Glass | $B_2O_3$ | $SiO_2$ | $Al_2O_3$ | PBO | MgO | BaO | CaO | $Na_2O$ | $K_2O$ | $SO_3$ | $F_2$ | $Fe_2$ |
|---|---|---|---|---|---|---|---|---|---|---|---|---|
| Container Flint | — | 74.1 | 1.8 | — | 1.4 | 0.2 | 8.8 | 13.0 | 0.4 | 0.1 | 0.3 | — |
| Container Flint | — | 73.0 | 1.7 | — | 1.2 | — | 10.4 | 13.2 | 0.4 | 0.1 | — | 0. |
| Container Flint | — | 71.6 | 1.6 | — | 4.6 | 0.1 | 7.1 | 14.7 | 0.3 | 0.1 | — | — |
| Container Flint | — | 71.70 | 0.96 | — | 2.5 | 0.42 | 10.2 | 13.7 | 0.15 | 0.25 | 0.25 | 0. |
| Borosilicate I | 13.5 | 76.2 | 3.7 | — | — | — | 0.8 | 5.4 | 0.4 | — | — | — |
| Borosilicate II | 10.0 | 74.3 | 5.6 | — | — | 2.2 | 0.9 | 6.6 | 0.4 | — | — | — |
| Borosilicate III | 12.0 | 81.0 | 2.5 | — | — | — | — | 4.5 | — | — | — | — |
| Lead Tableware | 0.6 | 66.0 | 0.9 | 15.5 | — | 0.5 | 0.7 | 6.0 | 9.5 | — | — | — |
| Lead Technical | 0.6 | 56.3 | 1.3 | 29.5 | — | — | — | 4.7 | 7.2 | — | — | — |

The container glass compositions given in Table II may also be prepared in accordance with the principles of my invention by again taking advantage of the forming characteristics of $Al_2O_3$ as a forming oxide for one composition. However, a more practical possibility for producing these glasses in accord with my invention might be to formulate a common base composition of $SiO_2$, $Na_2O$ and CaO and an additive composition containing the remaining constituents plus an additional portion of $SiO_2$ to act as a former therein. The exact composition and mixing ratio can be a compromise of desired melting characteristics of the two glasses. For example, if our goal is to reduce the melter operating temperature, we may desire to formulate a base composition from the $SiO_2$—$Na_2O$—CaO phase diagram, FIG. 1, that lies within the $Na_2O3CaO6SiO_2$ region having a melter temperature between 800° C. and 1050° C. to obtain the lowest practical melter operating temperature. The additive composition and mixing ratio would accordingly be fixed.

Having a general idea of how my glass making method may be applied consider the following specific examples and benefits obtained thereby.

EXAMPLE I

BOROSILICATE INSULATING WOOL GLASS

U.S. Pat. Nos. 2,877,124 and 2,882,173 teach glass compositions suitable for the manufacture of glass wood products. Preparing these compositions by my melting technique is particularly advantageous as will be seen from the following discussion. Generally, fiberizable wool glass compositions have the following composition by weight.

| CONSTITUENT | COMPOSITION RANGE IN PERCENT | TYPICAL COMPOSITION |
|---|---|---|
| $SiO_2$ | 50–65 | 61.5 |
| $Al_2O_3$ | 0–8 | 4.0 |
| CaO | 3–14 | 8.0 |
| MgO | 0–10 | 3.5 |
| $Na_2O$, $K_2O$, $Li_2O$ | 10–20 | 15.5 |
| $B_2O_3$ | 5–15 | 7.5 |
| $TiO_2$ | 0–8 | — |
| $ZrO_2$ | 0–8 | — |
| BaO | 0–8 | — |
| $Fe_2O_3$ | 0–12 | — |
| MnO | 0–12 | — |
| ZnO | 0–2 | — |

The primary volatile from the above molten glass composition is sodium borate which forms by the reaction of $Na_2O$ and $B_2O_3$ present in the molten glass composition. Accounting for the presence of sodium borate, the composition, may be written as:

| CONSTITUENT | PERCENT BY WEIGHT |
|---|---|
| $SiO_2$ | 61.5 |
| $Al_2O_3$ | 4.0 |
| CaO | 8.0 |
| MgO | 3.5 |
| $K_2O$ | 1.0 |
| $Na_2O$ | 11.0 |
| *$Na_2O$ | 3.5 |
| *$B_2O_3$ | 7.3 |

*Sodium borate constituents

Within the principles of my invention the constituents may be classified according to their relative volatility into two melting groups.

Group I (non-volatile constituents)

| CONSTITUENTS | COMPOSITION RANGE IN PERCENT | TYPICAL COMPOSITION |
|---|---|---|
| $SiO_2$ | 55–80 | 69.0 |
| $Al_2O_3$ | 0–10 | 4.5 |
| CaO | 3–10 | 9.0 |
| MgO | 0–12 | 3.9 |
| $K_2O$ | 0–2 | 1.1 |
| $Na_2O$ | 8–16 | 12.3 |

Group II (volatile constituents)

| CONSTITUENTS | COMPOSITION RANGE IN PERCENT | TYPICAL COMPOSITION |
|---|---|---|
| $Na_2O$ | 20–40 | 30.8 |
| $B_2O_3$ | 60–80 | 69.2 |

The group I composition may be identified as a soda lime silica glass closely resembling plate glass compositions, which although fiberizable are unsuitable as an insulating wool because of the absence of $B_2O_3$. The presence of $B_2O_3$ being necessary to provide thermal resistance and the necessary fiber surface chemistry to bond with phenol formaldehyde binders. However, soda lime silica glasses are less hostile to prepare than the desired borosilicate wool glass composition given above. The group II composition however, is highly volatile and corrosive. Therefore, the group I constituents are prepared as a molten base glass composition in a continuous glass melting unit common to the glass making industry. The sodium borate constituents of group II are then introduced into the molten base glass composition of group I either as a melt or raw batch formulation.

Since the group II composition represents approximately 11% by weight of the total glass composition, it may be melted in a significantly smaller melting unit and at a substantially lower operating temperature than the host composition. Thus, you may expect less sodium borate loss by volatilization simplifying the task of pollutant control. Further, since the soda lime silica glass of group I is approximately half as corrosive as the borosilicate wool glass composition one may expect a 100% increase in melter refractory life.

EXAMPLE II

BOROSILICATE TEXTILE FIBER GLASS

U.S. Pat. No. 2,334,961 teaches a borosilicate glass composition commonly referred to as E-glass which is easily formed into textile fibers and principally used as a reinforcement for plastics, tires etc. Generally, E-glass has the following composition by weight:

| CONSTITUENT | COMPOSITION RANGE IN PERCENT | TYPICAL COMPOSITION |
|---|---|---|
| $SiO_2$ | 50–65 | 55.0 |
| $Al_2O_3$ | 5–20 | 15.0 |
| CaO | 5–25 | 22.0 |
| MgO | 0–10 | — |
| $B_2O_3$ | 0–11 | 7.0 |
| $Na_2O$ | 0–10 | 0.5 |
| $TiO_2$ | 0–4 | — |
| $F_2$ | 0–4 | 0.5 |
| $Fe_2O_3$ | 0–2 | — |

The volatile constituents of concern within this molten glass composition are $B_2O_3$, $F_2$ and $Na_2O$. Therefore, similar to the wool glass example above, two melting groups may be identified as follows:

Group I (non-volatile constituents)

| CONSTITUENT | COMPOSITION RANGE IN PERCENT | TYPICAL COMPOSITION A | TYPICAL COMPOSITION B |
|---|---|---|---|
| $SiO_2$ | 50–70 | 64.5 | 62.0 |
| $Al_2O_3$ | 5–20 | 16.0 | 17.0 |
| CaO | 5–30 | 13.0 | 21.0 |
| $Na_2O$ | 0–10 | 0.5 | — |
| $Fe_2O_3$ | 0–2 | — | — |

Group II (volatile constituents)

| CONSTITUENT | COMPOSITION RANGE IN PERCENT | TYPICAL COMPOSITION A | TYPICAL COMPOSITION B |
|---|---|---|---|
| $SiO_2$ | 0–20 | 5.0 | 8.0 |
| $B_2O_3$ | 40–90 | 47.0 | 47.0 |

| | -continued | | |
|---|---|---|---|
| F$_2$ | 0–10 | 4.5 | 5.0 |
| Na$_2$O | 0–10 | — | 3.5 |
| Al$_2$O$_3$ | 0–20 | 1.0 | — |
| CaO | 0–50 | 40.0 | 33.0 |
| RO + R$_2$O$_3$ | 0–5 | 1.5 | 3.5 |
| Fe$_2$O$_3$ | 0–2 | — | — |
| MgO | 0–10 | — | — |
| TiO$_2$ | 0–10 | — | — |
| Fe$_2$O$_3$ | 0–4 | — | — |

By the above grouping the highly volatile constituents of group II, representing approximately 8% by weight of the desired fiberizable molten glass composition, may be separately prepared in a relatively small melter and added to the molten base glass composition realizing similar benefits as in preparation of the wool glass composition.

EXAMPLE III

TEXTILE FIBER GLASS HAVING EUTECTIC BASE

Figure 2:
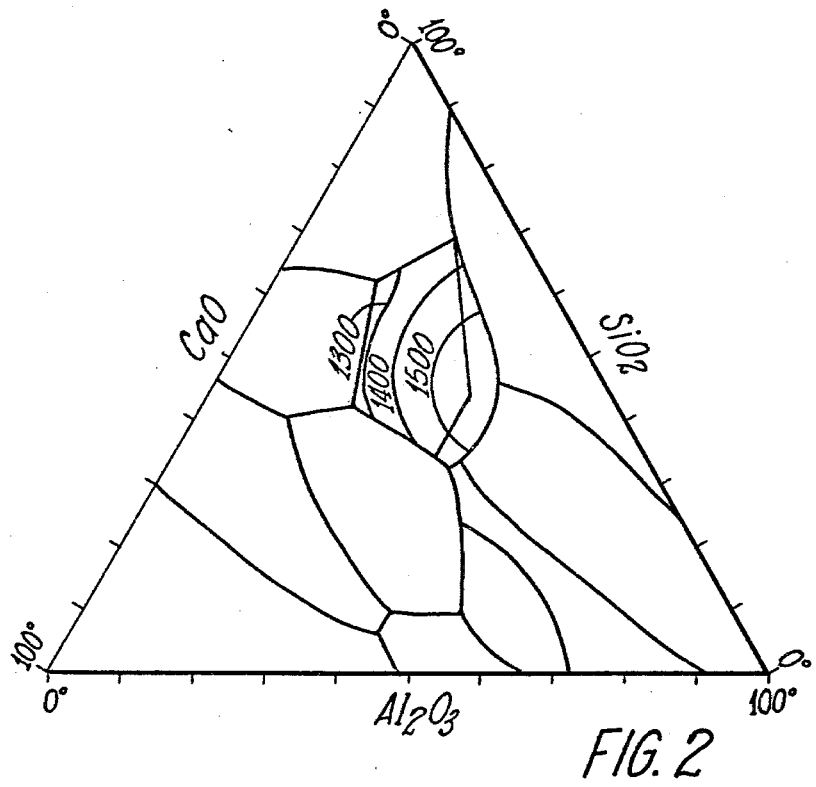
FIG. 2 presents the phase diagram for the $SiO_2$—$Al_2O_3$—$CaO$ system showing the eutectic point composition and related isotherms.

The present invention offers further advantages with respect to the preparation of E-glass compositions as discussed in example II above. Consider the CaO—Al$_2$O$_3$—SiO$_2$ system phase diagram of FIG. 2. If the non-volatile group is reformulated to:

| CONSTITUENT | PERCENT BY WEIGHT |
|---|---|
| SiO$_2$ | 62.0 |
| Al$_2$O$_3$ | 15.0 |
| CaO | 23.0 | the eutectic composition is obtained. Thus, the main melter used to melt the group I non-volatile composition may be operated at a minimum operating temperature.

The remnant constituents are added to the group II volatile composition which now becomes:

| CONSTITUENT | PERCENT BY WEIGHT |
|---|---|
| SiO$_2$ | 13.0 |
| CaO | 12.9 |
| Al$_2$O$_3$ | 12.3 |
| B$_2$O$_3$ | 54.0 |
| F$_2$ | 3.9 |
| Na$_2$O | 3.9 |

A further advantage realized is that this formulation allows the use of less expensive raw materials, such as colemanite, as a partial source of B$_2$O$_3$ reducing the need for more expensive boric acid.

EXAMPLE IV

SODA LIME GLASSES

A common glass composition useful in the manufacture of window or bottle glass is as follows:

| CONSTITUENT | PERCENT BY WEIGHT | TYPICAL BOTTLE | TYPICAL WINDOW |
|---|---|---|---|
| SiO$_2$ | 65–85 | 74.0 | 72.0 |
| Na$_2$O | 10–20 | 13.0 | 14.3 |
| Al$_2$O$_3$ | 0–10 | 1.8 | 1.3 |
| CaO | 0–15 | 8.8 | 8.2 |
| MgO | 0–5 | 1.4 | 3.5 |
| BaO | 0–5 | 0.2 | 0.2 |
| F$_2$ | 0–5 | 0.3 | — |
| K$_2$O | 0–5 | 0.3 | 0.2 |
| SO$_3$ | 0–1 | 0.1 | 0.3 |
| Fe$_2$O$_3$ | 0–1 | 0.3 | 0.2 |

These glass compositions contain a substantial percentage of Na$_2$O which has a high corrosive action upon the melter refractory. Thus, it would be advantageous to reduce the amount of Na$_2$O therein in the interest of melter life and economy.

In accord with the principles of my invention two possible melting groups may be identified as follows:

Group I (low corrosive melt)

| CONSTITUENT | PERCENT BY WEIGHT | TYPICAL BOTTLE | TYPICAL WINDOW |
|---|---|---|---|
| SiO$_2$ | 60–90 | 77.4 | 75.7 |
| Na$_2$O | 0–5 | 1.1 | 1.2 |
| Al$_2$O$_3$ | 0–10 | 2.9 | 2.1 |
| CaO | 0–30 | 14.5 | 13.9 |
| MgO | 0–10 | 2.3 | 5.9 |
| K$_2$O | 0–10 | 0.5 | 0.4 |
| BaO | 0–10 | 0.3 | — |
| F$_2$ | 0–10 | 0.5 | — |
| Fe$_2$O$_3$ | 0–2 | 0.3 | 0.3 |
| SO$_3$ | 0–2 | 0.1 | 0.5 |

Group II (high corrosive melt)

| CONSTITUENT | PERCENT BY WEIGHT | TYPICAL BOTTLE | TYPICAL WINDOW |
|---|---|---|---|
| SiO$_2$ | 60–75 | 68.6 | 66.5 |
| Na$_2$O | 10–40 | 31.0 | 33.2 |
| Al$_2$O$_3$ | 0–10 | 0.1 | 0.1 |
| Fe$_2$O$_3$ | 0–2 | 0.2 | 0.2 |

The group I low corrosive melt represents the largest portion of the two melts and therefore may be prepared as a base glass in a large continuous melter commonly used in the preparation of molten glass. The expected campaign life of the base glass melter will be extended by the substantial reduction of the composition's corrosiveness.

The group II high corrosive melt may be prepared in a relatively small melter and introduced to the base glass as a melt or a frit. Alternatively, the group II composition may be introduced to the molten base glass as a formulated batch thereby eliminating the need for an additive melter.

EXAMPLE V

EUTECTIC SODA LIME GLASS

The liquidus temperature of the group I base glass in example IV is estimated at 3100° F., and 1600° F. for the group II additive glass. By reformulating the group I melt to its best eutectic composition of:

| CONSTITUENT | PERCENT BY WEIGHT |
|---|---|
| SiO$_2$ | 61.6 |
| Al$_2$O$_3$ | 0.4 |
| CaO | 29.7 |
| MgO | 7.9 |
| Fe$_2$O$_3$ | 0.3 | we may effectively lower its liquidus temperature to approximately 2380° F. for improved thermal efficiency in melting.

Accordingly the group II additive will become:

| CONSTITUENT | PERCENT BY WEIGHT |
| --- | --- |
| $SiO_2$ | 72.7 |
| $Al_2O_3$ | 1.6 |
| CaO | 3.9 |
| MgO | 2.7 |
| $Na_2O$ | 18.3 |
| $K_2O$ | 0.3 |
| $Fe_2O_3$ | 0.4 |

EXAMPLE VI

MULTIPLE PRODUCT GLASS

Figure 3:
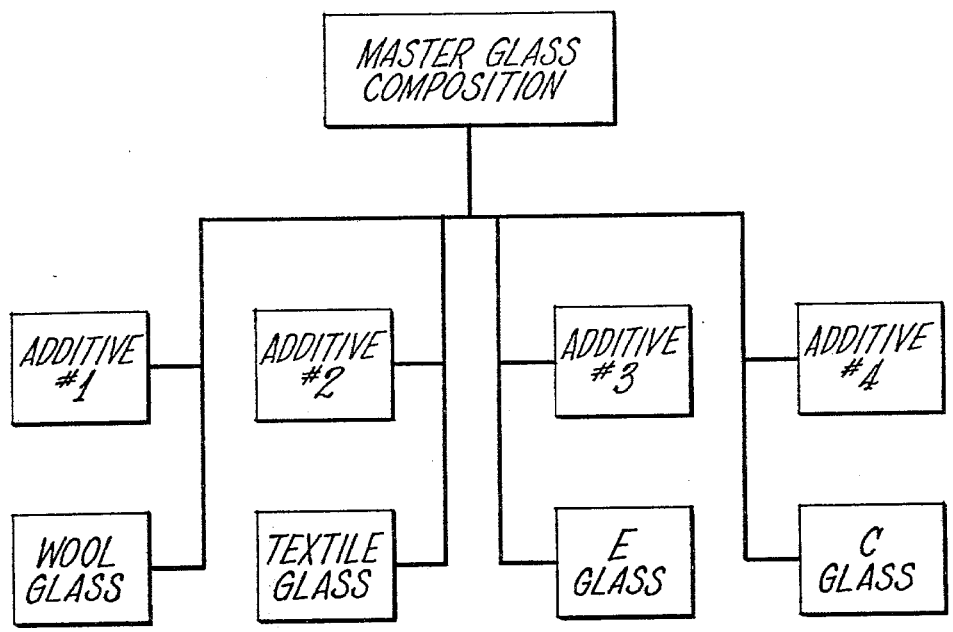
FIG. 3 presents a flow diagram for use in describing example VI.

FIG. 3 presents a flow diagram for a glass plant capable of producing a wool glass product, a textile glass product, an E glass product and a chemically resistant "C" glass product from one common glass composition. The master glass composition may comprise the composition:

| CONSTITUENT | PERCENT BY WEIGHT |
| --- | --- |
| $SiO_2$ | 63.4 |
| $Al_2O_3$ | 16.0 |
| CaO | 19.0 |
| $TiO_2$ | 0.6 |

Since the master composition is free of volatile and corrosive constituents a relatively long melter life may be expected and the problem of volatile loss with the corresponding pollutant emission has been eliminated.

By intermixing the master composition and the following additive compositions,

| CONSTITUENT | ADDITIVE PERCENT BY WEIGHT | | | |
| --- | --- | --- | --- | --- |
| | #1 | #2 | #3 | #4 |
| $SiO_2$ | 60.2 | 47.3 | — | 65.6 |
| $Al_2O_3$ | — | — | 4.9 | — |
| $B_2O_3$ | 8.0 | — | 48.6 | 7.2 |
| $Na_2O$ | 19.3 | 3.1 | 2.8 | 10.7 |
| CaO | 4.2 | 26.6 | 7.7 | 12.3 |
| MgO | 4.0 | 8.5 | 28.2 | 3.2 |
| $F_2$ | — | — | 4.2 | — |
| $Fe_2O_3$ | 0.3 | — | 2.8 | 0.3 |
| $TiO_2$ | — | 5.6 | 0.7 | — |
| ZnO | — | 8.8 | — | — |
| $K_2O$ | — | — | — | 0.7 |
| BaO | 3.1 | — | — | — |
| $SO_3$ | 0.5 | — | — | 0.1 | the following product glass compositions may be obtained:

| CONSTITUENT | WOOL GLASS | TEXTILE GLASS | E GLASS | C GLASS |
| --- | --- | --- | --- | --- |
| $SiO_2$ | 61.1 | 58.3 | 54.6 | 65.2 |
| $Al_2O_3$ | 3.6 | 10.9 | 14.5 | 4.0 |
| $B_2O_3$ | 6.2 | — | 6.9 | 5.4 |
| $Na_2O$ | 15.0 | 1.0 | 0.4 | 8.0 |
| CaO | 7.7 | 21.9 | 18.0 | 14.1 |
| MgO | 3.1 | 2.7 | 4.0 | 2.4 |
| $F_2$ | — | — | 0.6 | — |
| $Fe_2O_3$ | 0.2 | — | 0.4 | 0.2 |
| $TiO_2$ | 0.1 | 2.2 | 0.6 | 0.1 |
| ZnO | — | 2.8 | — | — |
| $K_2O$ | 0.3 | — | — | 0.5 |
| BaO | 2.4 | — | — | — |
| $SO_3$ | 0.4 | — | — | 0.1 |

Because of the mix ratio of additive to master it may be physically preferred to introduce and homogenize the master glass composition into additive 1 and 4. Additive #2 however, again presents the problem of $B_2O_3$ volatilization. It is suggested to those skilled in the art that by applying the principles of my invention to additive #1 it may in turn be prepared by the multi-step method. Thus, the wool glass product composition would be formed by the combining of three separately prepared compositions.

Almost any glass composition may be formulated into a base and one or more additive mixtures that when blended together and homogenized will produce a predetermined or desired product glass composition. The particular formulation of the base and additives will largely be a function of processing goals, physical properties of each composition, and raw materials available. Many trade-offs may be necessary to obtain desired processing goals whatever they may be.

Many problems heretofore confronting the glass making industry may be solved or reduced in scope by applying my multi-step glass making method.

Consider the teachings of U.S. Pat. No. 2,900,264, issued to Wilbur F. Brown Aug. 18, 1959. Brown teaches a method of changing the glass composition, within a continuously operating tank type furnace, from "regular" to glare resistant glass or vice versa without costly shut down and clean out of the tank. Changing from "regular" to glare resistant glass according to Brown requires making up a 0.355% deficiency of $Fe_2O_3$ within the tank. Brown's teaching requires a 72 hour period to accomplish the change over and produces a large amount of waste glass product. By the teachings of my invention herein a base glass composition may be formulated from which "regular," glare resistant or highly glare resistant glass may be produced by working into the base an appropriate additive composition. Thus, the long change over period, or tank down time, is no longer necessary and the amount of waste product is substantially reduced.

Consider further the teachings of U.S. Pat. No. 2,934,444 issued to Rowland D. Smith Apr. 26, 1960. Smith teaches a method by which the loss of $B_2O_3$ by volatilization from a glass melting tank might be reduced. Smith's teachings, however, require first synthesizing borax and boric acid to produce a sodium polyborate which may then be used as a batch ingredient. Such pre-processing of raw materials increases the cost of glass making and reduces the overall thermal efficiency. The problem may be more efficiently and economically solved by applying the principles of my invention as taught in my example I.

Still further, consider U.S. Pat. No. 2,411,031 issued to Alden J. Deyrup Nov. 12, 1946. Deyrup accounts for variations in optical glass compositions by the volatilization of constituents. The principles of my invention may be applied, as taught above, to solve the problem of volatile losses.

Also, consider the energy savings taught in U.S. Pat. No. 3,607,190 issued to Harvey L. Penberthy by preheating of batch prior to introduction to the melter. Penberthy is cautious not to pre-heat the batch granules to their fusion or sintering temperature as they then become tacky and difficult to transport. The temperature to which batch may be pre-heated is limited by the lowest sintering temperature of the combined batch ingredients. Applying the principles of my invention the low sintering temperature ingredients may be removed from the base batch formulation thereby elevating the temperature to which the batch may be pre-heated. Thus, greater thermal efficiency may be achieved. Further, since the removed volatiles are usually the more corrosive constituents to the refractory and the volatile emissions attack the tank crown, their removal provides additional cost savings by extending melter life.

EMBODIMENTS FOR PRACTICING MY INVENTION

In practicing my multi-step method of glass making it will most frequently be necessary to blend and homogenize molten compositions having significantly different properties, such as viscosity, density, softening point, working point, liquidus, surface tension, coefficient of expansion, modulus of elasticity and electrical resistivity into a workable glass composition having properties unlike any of the intermixed compositions. Therefore, the manner by which the molten compositions are intermixed and worked together to form the final desired glass composition becomes important.

Figure 4:
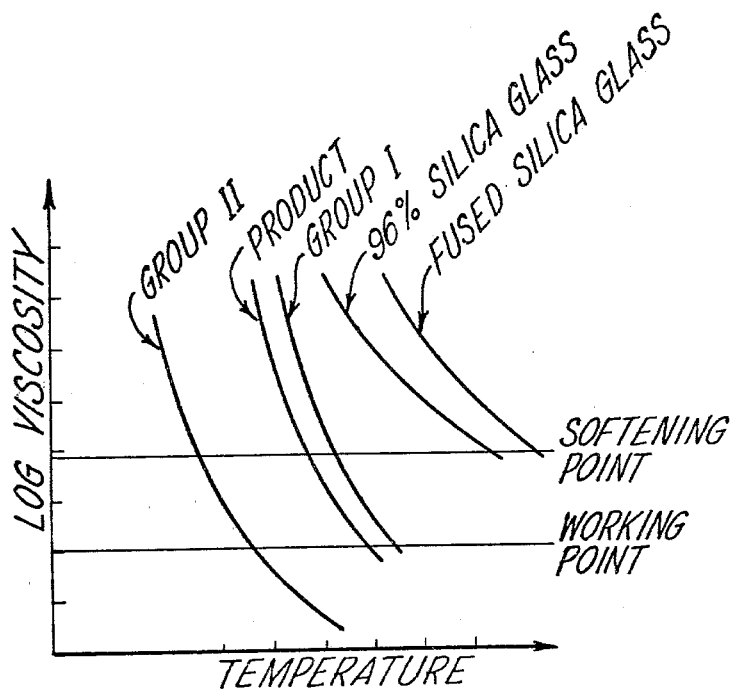
FIG. 4 presents a plot of representative curves illustrating the viscosity differences between molten compositions of example II.

Consider FIG. 4 presenting representative curves depicting molten viscosity-temperature relationships for the group I, group II and final homogenized product glass compositions of Example II. Curves representing fused silica glass 96% silica glass are plotted to provide a qualitative relationship between curves.

The viscosity of the group I host composition at 2683° F. is log 2.50 and that of the group II additive at 2000° F. is log 0.50. The final homogenized product glass composition has a viscosity of log 2.50 at 2339° F. Thus, intermixing the group II additive into the group I host may be compared to mixing ethylene glycol into corn syrup at room temperature.

FIGS. 5 through 9 present apparatus which has proven successful in producing textile fibers in accord with the principles of my invention. The apparatus and method presented in FIGS. 5 through 9 is disclosed and claimed in a separate patent application and is taught herein as an enabling means of practicing my invention. I have found it particularly desirable to mechanically blend the molten compositions immediately after they are brought together. This technique has been found necessary to prevent composition stratification which if permitted to occur, makes intermixing nearly impossible.

Figure 5:
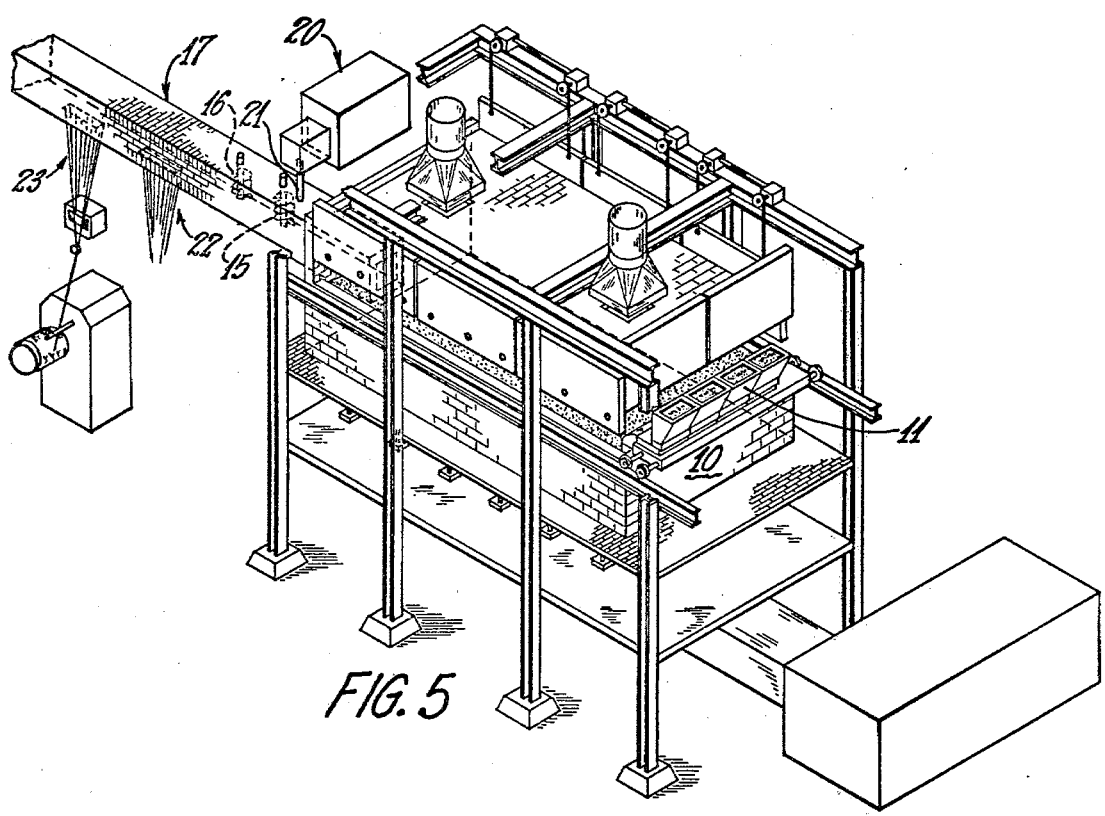
FIG. 5 shows a typical glass fiber forming operation embodying the present invention.

FIG. 5 illustrates typical apparatus for producing glass fibers embodying the present invention. A continuous glass melter 10 is charged with the base glass batch formulation by traversing hopper 11. Molten base glass is withdrawn from melter 10 and flowed through forehearth 12. Positioned downstream of melter 10 within forehearth 12 is a molten glass mixing zone indicated by spiral stirrers 15 and 16. A more detailed description of the mixing zone and function of the stirrers is presented below. The molten additive composition is prepared in separate melting apparatus 20 and introduced to the mixing zone through a suitable conduit 21. By a combined mixing and pumping action of stirrers 15 and 16 the molten additive composition is worked into and homogenized with the molten base glass composition forming the final molten glass composition. The final molten glass composition is then conveyed through distribution forehearth 17 to glass fiber forming positions 22 and 23.

Figure 6:
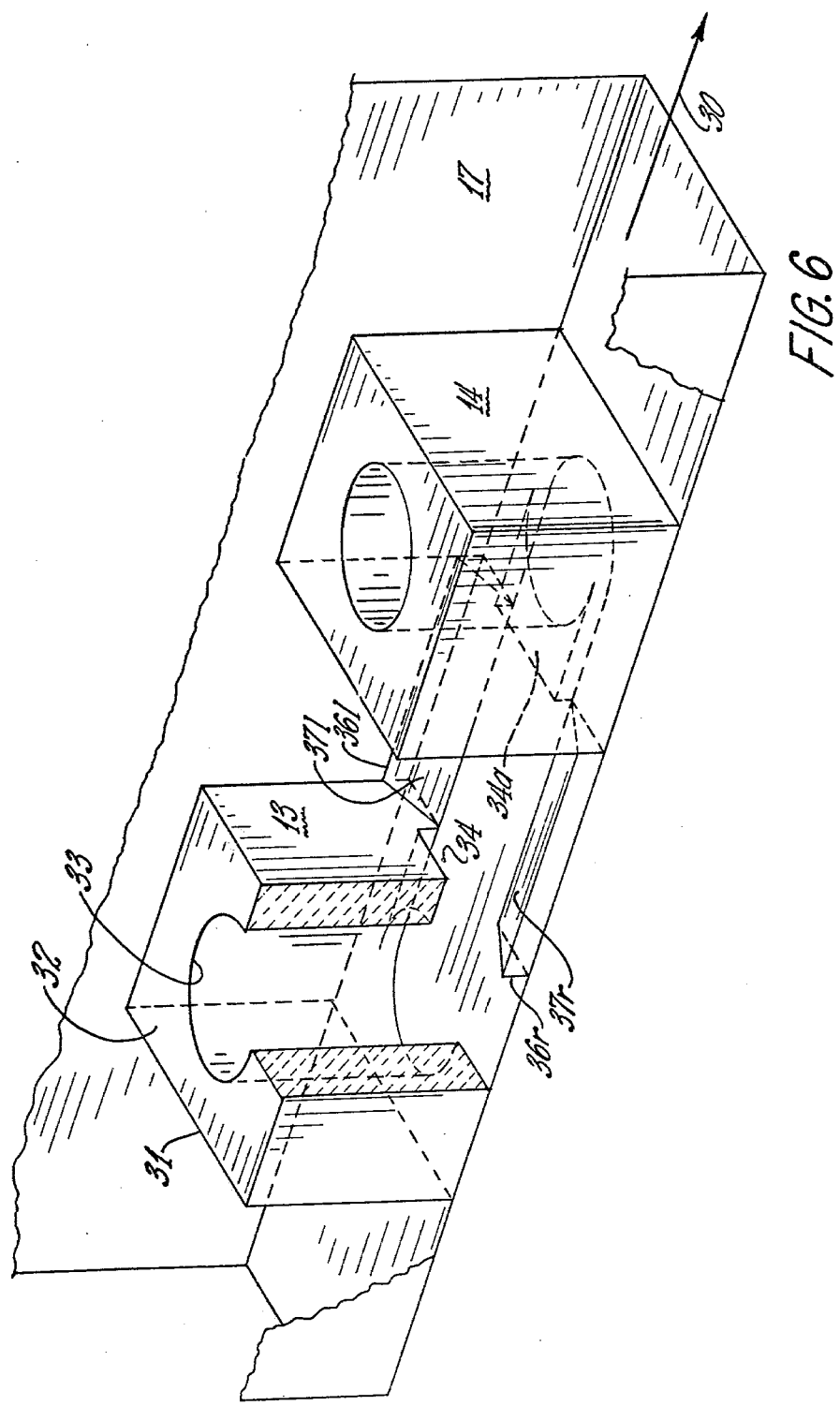
FIG. 6 is a pictorial view showing the general configuration of forehearth mixing apparatus suitable for practicing the invention.

FIG. 6 presents a pictorial view of the forehearth mixing zone with stirrers 15 and 16 removed so that the configuration and orientation of stirrer mixing blocks 13 and 14 may be viewed more clearly. The general flow of molten glass is from the upper left of FIG. 6 to the lower right as indicated by arrow 30. Mixing blocks 13 and 14 are identical structures; the only difference being their general orientation within the forehearth channel. Therefore, to avoid redundant discussion, the structure of block 13 will be described with the understanding that block 14 is the same except for orientation and function as described.

Block 13 extends across the forehearth channel with its upstream face 31 acting as a barrier or dam to the flow of molten base glass. Cylindrical stirrer well 33 extends downward from the top surface 32 of block 13 communicating with slot 34 which in combination with the forehearth channel floor forms a rectangular passage extending longitudinally with the forehearth channel exiting at the block downstream face 35.

Mixing block 14, similar in configuration to block 13, is positioned downstream of block 13 with its slot 34a facing upstream and opposite slot 34 of block 13. Extending between mixing blocks 13 and 14 are key blocks 36L and 36R having an angular face 37L and 37R slanting from the forehearth side walls to the forehearth floor thereby forming in combination with the forehearth floor a flow channel communicating between slot 34 of block 13 and slot 34a of block 14.

Figure 7:
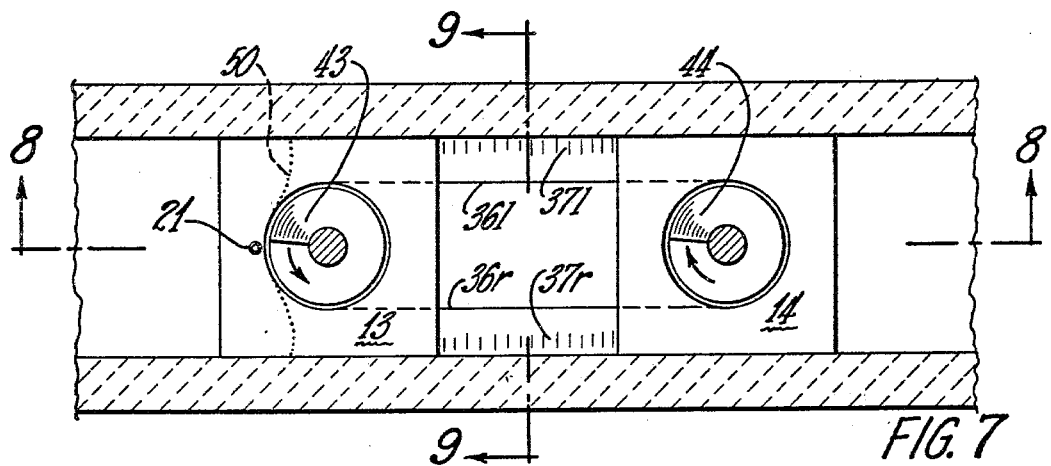
FIG. 7 is a schematic plan view of the forehearth mixing apparatus of FIG. 6 showing the elements thereof.
Figure 8:
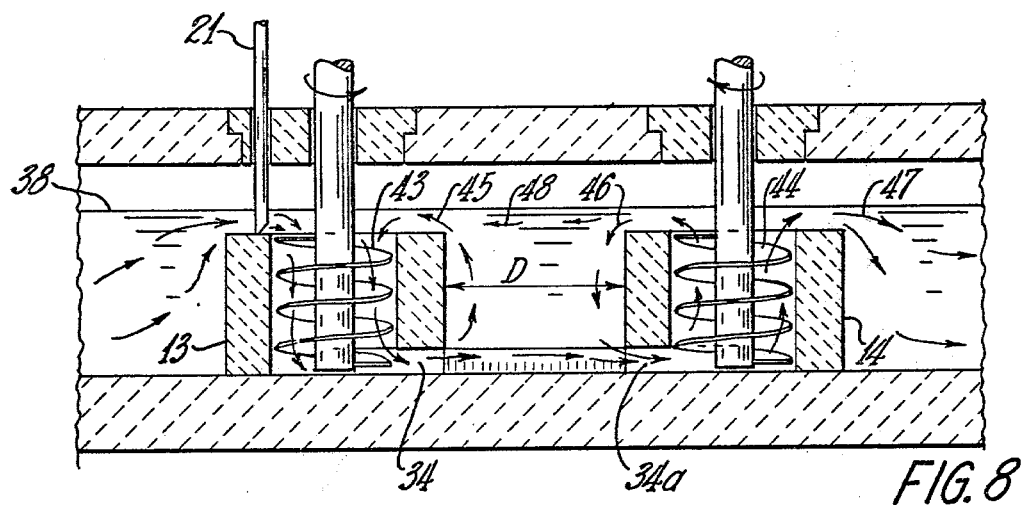
FIG. 8 presents a side elevation taken along line 8—8 of FIG. 7 showing the molten glass flow pattern.
Figure 9:
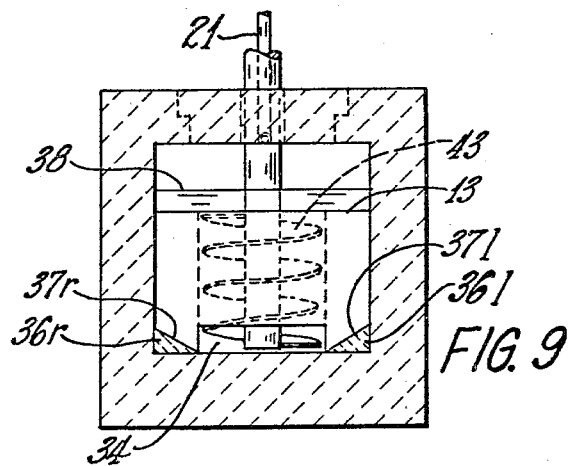
FIG. 9 presents an end elevation taken along line 9—9 of FIG. 7 looking upstream in the forehearth.

FIGS. 7 and 8 present a plan and side crossectional elevation view respectively, of mixing blocks 13 and 14 with screw-type stirrers 43 and 44 positioned therein. Stirrers 43 and 44 comprise a spiral blade wrapped about a central shaft rotatably powered, as indicated by the arrows in FIG. 7, by any preferred means such as a geared electric motor (not shown). Upstream mixing block 13 acts as a dam to the flowing molten base glass composition causing the base glass to flow over the top of the block and into the region of influence of stirrer 43. Immediately upstream of stirrer 43 the molten additive composition is introduced to the flowing base glass composition, through conduit 21, as it flows over the upstream portion of mixing block 13. The molten additive is preferably introduced below the surface of the flowing base glass composition as shown.

Stirrer 43 mixes the molten base glass and molten additive while pumping the mixture downward through mixing block 13 causing the mixture to exit in a downstream direction from slot 34. Key blocks 36L and 36R channel a major portion of the exiting mixture to slot 34a of block 14 which acts as an intake port for block 14. As indicated by arrow 45 in FIG. 8 a portion of the molten mixture exiting from slot 34 flows upward and is drawn back into mixing block 13 and thereby recycled through stirrer 43. The portion of molten mixture channeled to slot 34a is then further mixed while being pumped upward through block 14, by action of stirrer 44. Exiting at and flowing over the top surface of block 14 is the final molten glass composition. A portion of the molten glass exiting the top of block 14 flows upstream, a major portion of which arrow 46 is returned to the intake port 24a of block 14 and recycled; the lesser portion continues upstream, as indicated by arrow 48, and is recycled through mixing block 13. The remaining molten composition indicated by arrow 47 flows downstream to distribution forehearth 17. The reverse flow patterns, arrows 45, 46 and 48 cause the natural occurrence of a fluidic front or dam to be established atop mixing block 13 as indicated by line 50. Upstream of fluidic front 50 is pure base glass. Thus, the presence of fluidic front 50 directs the flow of unmixed molten base glass through mixing block 13 preventing fluidic short circuiting. Alternatively, a structural dam may be constructed atop block 13 thereby assuring the flow of unmixed base glass through block 13.

Figure 10:
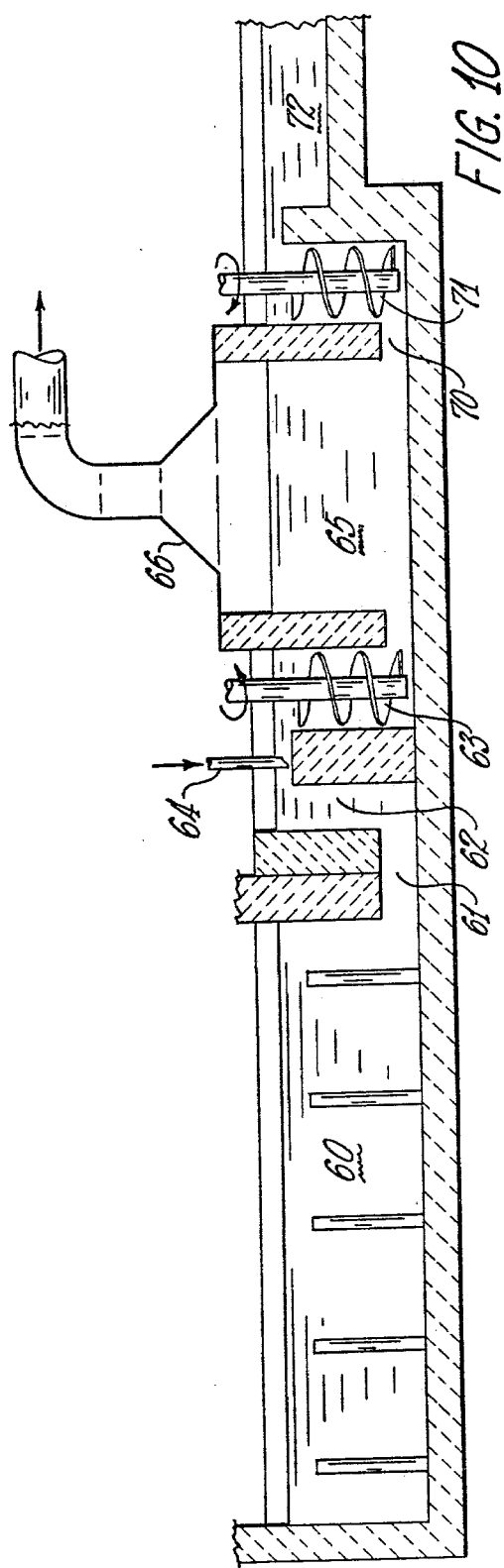
FIG. 10 presents an elevational schematic showing elements of a two zone glass melter suitable for practicing my invention.

FIG. 10 presents a cross-sectional elevation of a two zone furnace also suitable for practicing my invention. The main melting chamber 60 may employ electric joule effect heating or fossil fuel firing, whichever is preferred, to melt the base constituents. The molten base constituents flow through submerged throat 61 upward through riser 62 and into the pull or suction of downward pumping stirrer 63. The additive composition formulated to transform the molten constituents prepared in zone 60 into the final desired working or product glass composition is preferrably introduced upstream of stirrer 63 through suitable conduit means 64. It may be desired to forcefully blend the molten base composition as it proceeds upward through riser 62 by placing an upward pumping stirrer therein. Thus, the residence time for the molten base composition within zone 60 may be reduced.

Downward pumping stirrer 63 initially blends the base and additive compositions discharging the blended mixture into refining zone 65. Depending upon the volatility of the blended constituents residing in zone 65 it may be preferred to provide a hood and associated ducting to convey any volatile emissions to a scrubbing device, not shown.

From refining zone 65 the blended constituent mixture enters upward pumping stirrer 71 through entry port 70 therein being finally homogenized and flowing into supply forehearth 72 as a workable molten glass having the desired product forming characteristics.

Many alternatives to the apparatus of FIG. 10 are possible to improve functional operation. For example, heating electrodes may be placed in riser 62 to maintain the base constituent's exit temperature from melting chamber 60 or elevate its temperature to assist blending of the additive into the base composition. Mechanical or thermal mixing apparatus may be added to refining zone 65 to increase the rate of homogenization and reduce residence time therein.

Depending upon the composition being worked and their relative properties, such as viscosity or density it may be advantageous for example to introduce fluxing constituents in melter throat area 61 to lower the base composition viscosity in advance of further additive introduction. Thus, the base composition may be conditioned to receive additional additive constituents from conduit 64.

Figure 11:
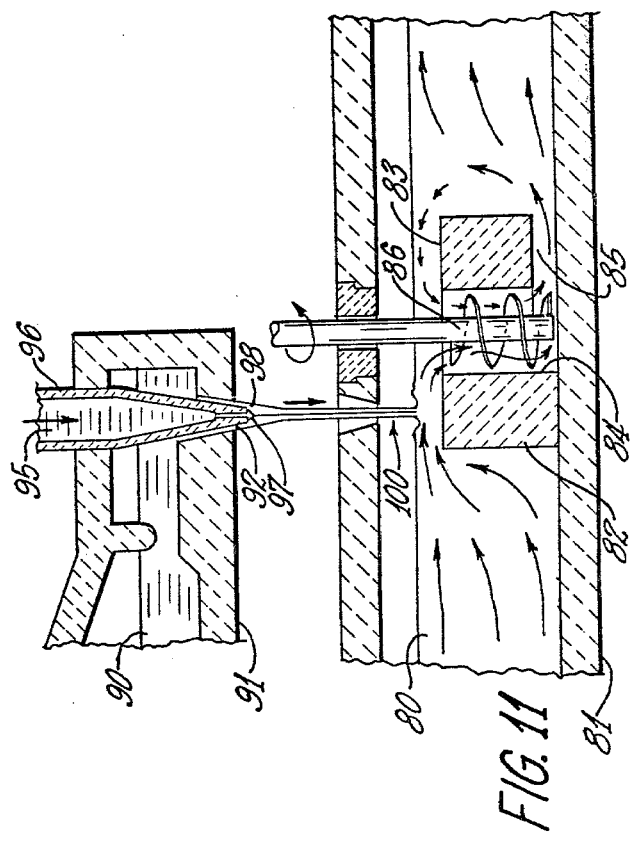
FIG. 11 presents an elevational schematic showing elements of melting apparatus suitable for practicing my invention.

FIG. 11 presents apparatus for practicing my invention which is particularly advantageous where three melting groups, one of which may be in batch form are blended for homogenizing into a desired product formable glass composition. A molten base composition 80 is prepared in a melter, not shown, and flowed into forehearth 81. Positioned within forehearth 81 is mixing block 82 extending into a dam like manner across the forehearth similar to block 13 of FIG. 8. Extending from the top surface 83 of block 82 is cylindrical passage 84 communicating with exit 85, similar to block 13 of FIG. 9. Positioned within passage 84 is stirrer means 86 suitable for blending, homogenizing and forcefully pumping molten constituents downward through passage 84 and exiting through exit 85 into the downstream portion of the forehearth. A first additive formulation is prepared as a molten composition 90 in melter 91 and flowed to exit orifice 92. A second additive formulation prepared as a molten composition 95 is a separate melter, not shown, is flowed through nozzle 96 which extends through molten composition 90 and into exit orifice 92 discharging a stream 97 of molten composition 95 wherein the center of, and encompassed by, stream 98 of molten composition 90 thus forming a composite stream 100. Composite stream 100 comprising both the first and second additive flows into the molten base composition stream upstream of stirrer 86 and is drawn into stirrer 86 along with the molten base composition. Stirrer 86 blends and homogenizes the three molten compositions into the final desired product composition. Apparatus of FIG. 11 may be particularly advantageous where molten composition 95 is highly volatile as it may be completely surrounded by molten stream 98 preventing volatile losses from stream 97.

Molten composition 95 may be prepared in a melter of the type disclosed in U.S. Pat. No. 3,429,972 suitable for preparing molten compositions of mineral constituents having relatively high fusion temperatures such as $SiO_2$. Molten composition 95 may be replaced by an unmelted batch formulation as taught in U.S. Pat. No. 2,371,213.

The apparatus of FIG. 11 may be conveniently modified for processing a product glass composition from two melting groups. Melters 91 and 96 may be used to prepare the base and additive compositions respectively. Composite stream 100 may then be feed directly into any suitable mixing apparatus known in the art. For example, the apparatus disclosed in U.S. Pat. Nos. 3,942,968; 3,811,861; 3,725,025; 3,486,874; 3,174,729; 3,057,175; 2,730,338; 2,716,023; 2,688,469; 2,577,920; 2,570,079; 2,569,459 and 2,520,577 might be used.

By practicing my improved method of preparing molten glass compositions a new freedom of glass formulating is available. Not only may specific base glasses be formulated to improve the over all economics of the glass making process but highly volatile constituents, such as water, may now be formulated into the molten glass composition.

In conclusion, it is pointed out that while the illustrative examples constitute practical embodiments of the invention, it is not intended to limit the invention to the exact details shown since modifications may be made without departing from the spirit and scope of the invention disclosed.

I claim:

1. A process for forming a borosilicate glass fiber of a predetermined chemical composition containing 5–15% $B_2O_3$ comprising:
    (a) separating the batch ingredients for said predetermined fiber composition into ingredients for forming a host glass and for forming a $B_2O_3$-containing additive glass, said host glass having a higher liquidus than said additive glass and said additive glass being more corrosive than said host glass;
    (b) melting said ingredients for forming said host glass in a horizontally disposed, continuous flow, main-melter;
    (c) flowing said molten host glass from said main melter to a location where said fibers are formed;
    (d) separately melting said additive glass and combining, with forceful mechanical mixing, said molten additive glass with a larger portion of said molten host glass prior to said fiber forming location to form a fiberizable borosilicate glass, and
    (e) forming said borosilicate fiber at said fiber forming location from said fiberizable glass, at least a major proportion of the $B_2O_3$ content of said fiber being supplied by said additive glass, said melter exhibiting longer life and the volatilization losses of $B_2O_3$ being substantially less than that obtained when melting the ingredients of said additive and host glass together in said melter.

2. The process of claim 1 wherein substantially all the $B_2O_3$ of said fiber is supplied by said additive glass.

3. The process of claim 2 wherein said fiber includes fluorine, substantially all of which is supplied by said additive glass.

4. The process of claim 1 wherein the composition of said host glass is such that its viscosity and/or liquidus temperature are unsuitable for practicable forming and said additive glass is added in an amount so that the combined glass is suitable for practicable forming.

5. The process of claim 1 wherein said ingredients for forming said host glass are pelletized and preheated to a temperature below which they will agglomerate prior to melting in said melter.

6. The process of claim 1 wherein about 11% by weight of the ingredients of said fiber are supplied as said additive glass.

7. The process of claim 1 wherein about 8% by weight of the ingredients of said fiber are supplied as said additive glass.

* * * * *